(12) United States Patent
Heenan et al.

(10) Patent No.: US 8,861,780 B2
(45) Date of Patent: Oct. 14, 2014

(54) RAIN DETECTION APPARATUS AND METHOD

(75) Inventors: Adam John Heenan, Sheffield (GB); Roger John Hazelden, Tamworth (GB); Martin John Thompson, Birmingham (GB); Alastair James Buchanan, Sutton Coldfield (GB)

(73) Assignee: TRW Limited, Solihull, West Midlands (GB)

(*) Notice: Subject to any disclaimer, the term of this patent is extended or adjusted under 35 U.S.C. 154(b) by 116 days.

(21) Appl. No.: 13/402,484

(22) Filed: Feb. 22, 2012

(65) Prior Publication Data

US 2012/0169877 A1   Jul. 5, 2012

Related U.S. Application Data

(60) Division of application No. 11/035,677, filed on Jan. 14, 2005, now Pat. No. 8,180,099, which is a continuation of application No. PCT/GB03/03061, filed on Jul. 16, 2003.

(30) Foreign Application Priority Data

Jul. 16, 2002 (GB) .................................. 0216483.8

(51) Int. Cl.
*G06K 9/00* (2006.01)
*G06T 7/20* (2006.01)
*B60S 1/60* (2006.01)
*B60S 1/48* (2006.01)
*B60S 1/08* (2006.01)

(52) U.S. Cl.
CPC ............... *B60S 1/603* (2013.01); *G06T 7/2053* (2013.01); *B60S 1/485* (2013.01); *B60S 1/0822* (2013.01); *B60S 1/0844* (2013.01); *B06K 9/00791* (2013.01)
USPC ............................ 382/100; 382/104; 382/106

(58) Field of Classification Search
USPC ......................................... 382/100, 104–106
See application file for complete search history.

(56) References Cited

U.S. PATENT DOCUMENTS 5,027,001 A   6/1991   Torbert
5,276,389 A   1/1994   Levers
(Continued)

FOREIGN PATENT DOCUMENTS

DE   29811086 U1   9/1998
GB   2311602 A   10/1997
(Continued)

OTHER PUBLICATIONS

PCT International Preliminary Examination Report, Application No. PCT/GB03/03061, Dated Oct. 20, 2004.
(Continued)

*Primary Examiner* — Wesley Tucker
(74) *Attorney, Agent, or Firm* — MacMillan, Sobanski & Todd, LLC

(57) ABSTRACT

A rain detection apparatus includes a camera that views a surface and a processor that captures an image from the camera. The processor generates a signal indicative of rain on the surface from information contained in the captured image and optionally drives a surface cleaning apparatus in response thereto. The apparatus captures images focused at a plurality of distances. The processor includes an edge detector that detects edges visible in the captured image and a difference structure that calculates the difference between the number of edges visible between differing images. The edge detector disregards edges close to areas of light larger than the largest raindrop that is desired or expected to be detected. The apparatus optionally includes a backlight, and the difference in numbers of edges between frames with and without the backlight illuminated are used to distinguish between background features and rain on the surface.

8 Claims, 10 Drawing Sheets

(56) References Cited

U.S. PATENT DOCUMENTS

| | | |
|---|---|---|
| 5,890,021 A | 3/1999 | Onoda |
| 5,900,821 A | 5/1999 | Petzold |
| 5,923,027 A | 7/1999 | Stam et al. |
| 6,097,024 A | 8/2000 | Stam et al. |
| 6,160,369 A | 12/2000 | Chen |
| 6,313,454 B1* | 11/2001 | Bos et al. ............ 250/208.1 |
| 6,353,392 B1 | 3/2002 | Schofield et al. |
| 6,392,218 B1 | 5/2002 | Kuehnle |
| 6,396,397 B1 | 5/2002 | Bos et al. |
| 6,617,564 B2 | 9/2003 | Ockerse et al. |
| 6,681,163 B2 | 1/2004 | Stam et al. |
| 6,807,287 B1 | 10/2004 | Hermans |
| 7,612,356 B2* | 11/2009 | Utida et al. ............ 250/573 |
| 7,646,889 B2* | 1/2010 | Tsukamoto ............ 382/104 |
| 7,772,794 B2 | 8/2010 | Kokuryo et al. |
| 2001/0010514 A1 | 8/2001 | Ishino |
| 2003/0066948 A1* | 4/2003 | Ockerse et al. ............ 250/208.1 |
| 2003/0069674 A1 | 4/2003 | Stam et al. |
| 2004/0144911 A1 | 7/2004 | Stam et al. |
| 2005/0035926 A1* | 2/2005 | Takenaga et al. ............ 345/8 |
| 2006/0163458 A1* | 7/2006 | Reime ............ 250/227.25 |
| 2013/0002873 A1* | 1/2013 | Hess ............ 348/148 |

FOREIGN PATENT DOCUMENTS

| | | |
|---|---|---|
| JP | 8058529 A | 3/1996 |
| JP | 2001018762 A | 1/2001 |
| JP | 2001141838 A | 5/2001 |
| WO | 9944173 | 9/1999 |

OTHER PUBLICATIONS

International Search Report, Application No. PCT/GB03/03061, Dated Oct. 22, 2003.

* cited by examiner

Frame Subtraction Control Diagram

Edge Count Subtraction Control Diagram

RAIN DETECTION APPARATUS AND METHOD

CROSS-REFERENCE TO RELATED APPLICATIONS

This application is a divisional patent application of U.S. patent application Ser. No. 11/035,677, filed Jan. 14, 2005, which was a continuation of International Application No. PCT/GB03/03061, filed Jul. 16, 2003, which claims priority from U.K. Patent Application No. 0216483.8, filed Jul. 16, 2002. The disclosures of all of such applications are incorporated herein by reference.

BACKGROUND OF THE INVENTION

This invention relates to rain detection apparatus and method. In particular but not exclusively, it relates to a vehicle window cleaning apparatus. It also relates to a vehicle fitted with such an apparatus.

In one known situation, it has long been desired to automatically sense the condition of a vehicle window in order to activate vehicle window cleaning apparatus. An example would be to automatically activate the wipers and/or washers of a car's window (commonly referred to as a windscreen or windshield) should the window become rained upon or should it become otherwise obscured by dust, dirt or debris.

Prior art solutions to the problem have generally used infra red sensors or sensors of the visible yellow type mounted on the appropriate window. However, these only sense the condition of a limited area of window and require close association with the window, which can cause problems should the window need replacing.

As well as cleaning of vehicle windows, it is also desirable to provide for the automatic cleaning of many other surfaces where obscuring media such as rain drops, dirt or debris on the surface would cause problems if it obscures the view through the surface. An example would be the glass or plastic lens of a headlamp or other light of a vehicle.

SUMMARY OF THE INVENTION

According to a first aspect of the invention there is provided a rain detection apparatus; comprising a camera adapted to view a region of a surface and a processor adapted to capture at least one image from the camera, in which the processor is further adapted to generate at least one signal to indicate the presence of rain on the surface from information contained in the at least one captured image.

By rain, we may include fog, mist, spray, drizzle and other forms of moisture or obscurating media that may form, fall or otherwise be incident upon the surface.

The apparatus may be adapted to capture images at a plurality of distances. In a particularly advantageous embodiment where the surface is a part of a vehicle, the apparatus may be adapted to sense the location of other vehicles or of lane markings on a road in which the vehicle to which the system is fitted is situated. In such an embodiment, the camera may be adapted to be focused at a plurality of distances. One of these distances may correspond to viewing the vehicle window and another to viewing the road ahead of the vehicle. Accordingly, the camera may be provided with a bi-focal lens, or a multi-focal lens. Alternatively, the camera may, in use, continually change focus, or a focusing mirror may be used or other means of achieving a dual focus system may be provided. The camera may be adapted to focus on the surface over a first region of its field of view, and the road over a second region of its field of view.

Combining lane and vehicle detection apparatus with the apparatus herein described is especially advantageous as both use the same hardware and even elements of the same software and so use of such can be shared.

The surface may comprise a window, a window of a vehicle or perhaps a surface of a lamp such as a vehicle headlight. Such a system has the advantages that it requires no contact with the surface, it can work with visible light and can easily be adapted to sense any area of the window desired. In fact, it is preferable for the camera not to be in contact with the surface.

The surface may be the front window of the vehicle, commonly known as the windscreen or windshield of the vehicle. Equally, it may be the rear window or any other window.

The apparatus may be adapted to control a vehicle window cleaning apparatus adapted to clean the surface, which may comprise one or more wipers, which wipe the surface of the vehicle window, preferably at an adjustable speed. The vehicle window cleaning apparatus may also comprise one or more washers, whereby washer fluid (perhaps water, possibly with added detergent or anti-freeze) can be sprayed onto the surface of the vehicle window.

The surface may be a cover or lens of a vehicle light such as a headlight. In this case, a camera may be provided inside the headlight behind the cover or lens.

The system may be provided with fault warning means such as a lamp or a sounder, which are adapted to alert a user of the system should a fault condition occur.

The processor may include edge detection means adapted to detect edges visible in the at least one captured image. This may be performed by calculating the spatial rate of change of pixel intensity in each of the at least one image. The spatial rate of change may only be calculated in one, preferentially horizontal, direction. Accordingly, vertical edges would be thereby detected. This may be performed by convolving the image, typically with a Sobel-like mask or other suitable mask. The position of the edges may be determined as the positions at which the spatial rate of change exceeds a prescribed threshold. An example of a suitable edge detection technique is taught in WO 99/44173 in which the edges of lanes on a highway are detected.

The processor may also include counting means whereby the number of detected edges in the, or each, captured image may be counted. This may give an indication of the amount of rain on the vehicle window. In an alternative, the counting means may be adapted to count edges that are new compared with a previous image. Mask memory may be provided, which is adapted to record which edges are old, i.e. exist in the previous image, allowing the processor to determine which edges are new.

The apparatus may be provided with a backlight, arranged to illuminate the surface. The backlight may be adapted to cause any rain on the surface to be substantially more visible to the camera for example by being mounted at an angle of less than 90.degree. to the surface. The apparatus may be adapted such that rain is not visible to the camera without the backlight illuminated. This therefore allows successive images to be captured with and without the backlight illuminated. The backlight may comprise a plurality of individual illumination sources, or a single illumination source.

The processor may further comprise difference means adapted to calculate the difference between the number of edges visible between images captured with and without the backlight illuminated. This advantageously provides for the apparatus to be able to discern between background features such as the headlights of oncoming vehicles visible with or without the backlight illuminated and rain and suchlike only visible (or only detectable) with the backlight illuminated. Furthermore, only counting the number of edges in each image and then taking a difference requires the use of less memory than a frame subtraction technique, where individual elements (such as pixels or individual edges) of differing captured images are compared. It is also less prone to errors due the background of the images captured changing, as the position of the edges counted is irrelevant. The difference means may also subtract the number of edges due to specular reflection of the backlight from the number of edges detected. This may be a predetermined constant number.

The backlight may be adapted to illuminate the surface with visible or infrared light, and may illuminate the surface with a given range of frequencies. The processor may be adapted to control the activation of the backlight. The apparatus may further comprise a filter, typically an optical bandpass filter, which preferentially allows the range of frequencies to pass.

In an alternative to the masks discussed above, the mask with which the, or each, captured is convolved may be adapted to disregard edges close to areas of light larger than the largest raindrop that is desired or expected to be detected. The mask may therefore ignore edges due to the headlights of oncoming vehicles or specular reflection off the surface. The mask may comprise a central peak, and two troughs spaced on either side of the central peak in convolution space. The peaks and the troughs may be of non-zero width, and may be separated from one another by areas of mask having a value of zero, or substantially zero. The peaks and the troughs may be of opposite sign, and may each have linear rising and falling edges and an optional constant maximum absolute value of non-zero width in convolution space.

Use of this mask may mean that the results of convolving the, or each, captured image with the mask for an edge corresponding to a background feature such as an oncoming headlight or the specular reflection of the backlight off the surface are less significant than those for edges due to rain. The apparatus may therefore include thresholding means whereby any detected edges having a convolved value less than a predetermined threshold are not considered as edges.

The apparatus may be further adapted to detect the presence of mist on the surface. By mist, we may mean mist, fog or other small radius drops of moisture. To this end, the processor may be adapted to calculate the difference in intensity of the captured image in the area around, but not including, the area of the image in which the specular reflection of the backlight is found, between images in which the backlight is illuminated and where it is not. The presence of a high difference in illumination has been determined to be indicative of the presence of mist (large amounts of non-specular reflection). The difference may be taken of the average intensities around the specular reflection of the backlight, or the difference itself may be averaged.

According to a second aspect of the invention there is provided a vehicle fitted with the surface cleaning apparatus control system of the first aspect.

According to a third aspect of the invention, there is provided a method of detecting the presence of obscuring material on a surface, the method comprising capturing images of the surface and then calculating one or more characteristics of the condition of the surface from the captured images.

The surface may comprise a vehicle window, or perhaps a cover for a light of a vehicle such as a headlamp. The images captured may be specifically focused on the vehicle window.

In a particularly advantageous embodiment, the method also includes detecting the positions of lanes or vehicles surrounding a vehicle from information contained in the at least one captured image. In such a case, the at least one captured image may be partially focused on the vehicle window and partially elsewhere, for example on the road ahead of the vehicle. Alternatively, successive captured images may be focused on the vehicle window for use in determining the condition of the vehicle window and elsewhere, for use in lane and vehicle detection.

The images may be captured at a rate of substantially 100, 50, 20, 10, 5, 2 or 1 per second, or every 1 s, 2 s, 5 s or 10 s. Equally, they may be captured at any suitable rate. The images may be captured at a fixed rate substantially between 1 to 100 per second or one image between for example 1 to 10 seconds. Optionally the capture rate may be varied in accordance with a prescribed operational parameter of the system such as vehicle speed when the invention is associated with a motor vehicle.

The images may be of substantially all or part of the surface to be sensed such as between 1% and 100% of the total surface. For example, they may be of at least 75%, 50%, 40%, 30%, 25% or 10%. The size may be determined so as to provide sufficient data for reliable processing.

The method may include the step of detecting edges visible in the images. This may include the step of calculating the spatial rate of change of pixel intensity in each of the images. The spatial rate of change may only be calculated in one, preferentially horizontal, direction. Accordingly, vertical edges would be thereby detected. This may be performed by convolving the image, typically with a Sobel-like mask. The position of the edges may be taken as the positions at which the spatial rate of change exceeds a predetermined threshold.

Alternatively, the mask may be adapted to disregard edges close to areas of light larger than the largest raindrop that is desired or expected to be detected. The mask may therefore ignore edges due to the headlights of oncoming vehicles or specular reflection off the surface. The mask may comprise a central peak, and two troughs spaced in convolution space therefrom. The peaks and the troughs may be of non-zero width, and may be separated from one another by areas of mask having a value of zero, or substantially zero. The peaks and the troughs may be of opposite sign, and may each have linear rising and falling edges and an optional constant maximum absolute value of non-zero width in convolution space.

Use of this mask may mean that the results of convolving the, or each, captured image with the mask for an edge corresponding to a background feature such as an oncoming headlight or the specular reflection of a backlight off the surface are less significant than those for edges due to rain. The method may therefore include the step of thresholding the convolved values such that edges having a convolved value less than a predetermined threshold are not considered as edges.

The edges detected may be those of raindrops. By raindrops, we may include fog, mist, spray, drizzle and other forms of moisture or obscurating media that may form, fall or otherwise be incident upon the surface.

The number of detected edges in each image may then be counted to give, for example, an indication of the amount of rain on the vehicle window. This may be referred to as an "edge counting" method. In an alternative, so-called "edge boundary masking" method, edges that are new compared with a previous image may be counted. In the case where there is no previous image, all detected edges may be counted as new. Preferably a running total of new edges is kept. A mask may be used to record which edges are new. With each image, the mask may be updated. Updating the mask may involve marking the areas around new edges as old. The area marked as old with each new image may be the new edges dilated by a predetermined amount.

These two alternatives provide two different ways to interpret the edges visible on the vehicle window. The first alternative is simple and requires little processing power whilst the second alternative is more able to cope with shifting raindrops and movement of background images. Furthermore, in the second alternative the number of new edges in each image may be used to determine the rate at which it is raining and the running total may be used to determine the amount of rain on the vehicle window.

The method may further comprise the step of taking the difference between the number of edges visible between images captured with and without a backlight illuminated. This advantageously provides for the method to be able to discern between background features such as the headlights of oncoming vehicles visible with or without the backlight illuminated and rain and suchlike only visible (or only detectable) with the backlight illuminated. Furthermore, only counting the number of edges in each image and then taking a difference requires the use of less memory than a frame subtraction technique, where individual elements (such as pixel s or individual edges) of differing captured images are compared. It is also less prone to errors due the background of the images captured changing, as the position of the edges counted is irrelevant. The difference means may also subtract the number of edges due to specular reflection of the backlight on the surface from the number of edges detected. The number of edges due to specular reflection of the backlight on the surface may be a predetermined constant number.

The method may further include the step of controlling vehicle window cleaning apparatus according to the sensed vehicle window condition. Advantageously, the vehicle window cleaning apparatus may include one or more wipers, which wipe the vehicle window, or washers, which spray the vehicle window with fluid.

In a further development of the system, the average size and or density of the detected media may be further used to control the cleaning apparatus. In the case that the vehicle window cleaning apparatus is one or more wipers, such control may include calculating average raindrop size and density. The average size and density of raindrop may then be used to generate a signal indicative of the speed at which the wiper or wipers are to run. An intermediate factor may be calculated for each of the density and average raindrop size. These two factors may then be multiplied together to form a wiper control signal. Each factor may be between 0 and 1. Each factor may be zero below a first value of either average raindrop size or density respectively and 1 above a second value of average raindrop size or density respectively. Between first and second values, the factors may linearly increase with average raindrop size or density. The factors may increase from an initial factor value to a terminal factor value. Preferably, the initial factor value is between 0 and 1 and the terminal factor value is 1.

Accordingly, the wiper or wipers will only be operated should both average size and density of raindrops exceed certain limits, and will be limited to running at a maximum speed indicated by a wipe control signal of "1".

The limits at which wipers (or other cleaning apparatus) are operated may be adjustable, and may be controlled by a user such as a driver of a vehicle. This can also be applied with the basic edge detection method, with the number of edges that need to be obscured before cleaning being adjustable or otherwise user defined.

The vehicle window cleaning apparatus may be activated with no direct user interaction. This enables the user of a vehicle to concentrate on their driving or other such tasks without the need to directly operate the apparatus.

In the case where the amount of rain is determined by counting new edges, at least one of any running total and the mask may be reset when the vehicle window is cleared. This may be sensed by determining when the wiper or wipers have wiped the vehicle window. Alternatively, the total number of edges visible ignoring the mask may be counted and should a sudden decrease occur the vehicle window is considered cleared.

This step is included as the edge boundary masking method assumes that edges never disappear and hence the total number of edges always increases.

The amount of rain may be integrated over time, such that the amount of time that rain has been-present on the surface is taken into account. The method may include the step of causing the surface to be cleaned when the integrated value exceeds a predetermined limit. This advantageously allows small amounts of rain to be wiped after a maximum amount of time.

Furthermore, the method may include determining whether at least one of dirt, dust, ice, frost and mist exist on the vehicle window. If one or more does, then appropriate steps such as activating the vehicle window cleaning apparatus, activating a vehicle window heater, activating a vehicle heater or activating a vehicle air conditioning system may be taken. The method may include reading the temperature external to the vehicle, typically with an onboard external temperature sensor of the vehicle. The method may therefore include activating the vehicle heater or demister in response to the measured temperature, preferably in combination with the detected window condition.

By mist, we may include haze, dew, fog or other small radius drops of moisture. To this end, the method may include the steps of calculating the difference in intensity of the captured image between images in which a backlight is illuminated and where it is not in the area around, but not including, the area of the image in which the specular reflection of the backlight is found. The presence of a high difference in illumination has been determined to be indicative of the presence of mist (large amounts of non-specular reflection). The difference may be taken of the average intensities around the specular reflection of the backlight, or the difference itself may be averaged.

Also, the method may include the step of detecting from the smear pattern visible on the vehicle window after a wipe has passed the condition of the wiper. This may involve a Hough transform of the smear pattern. Such smear patterns may also be used to indicate dirty water on the vehicle window and to take appropriate action. The system may be able to differentiate between rain, snow and ice.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
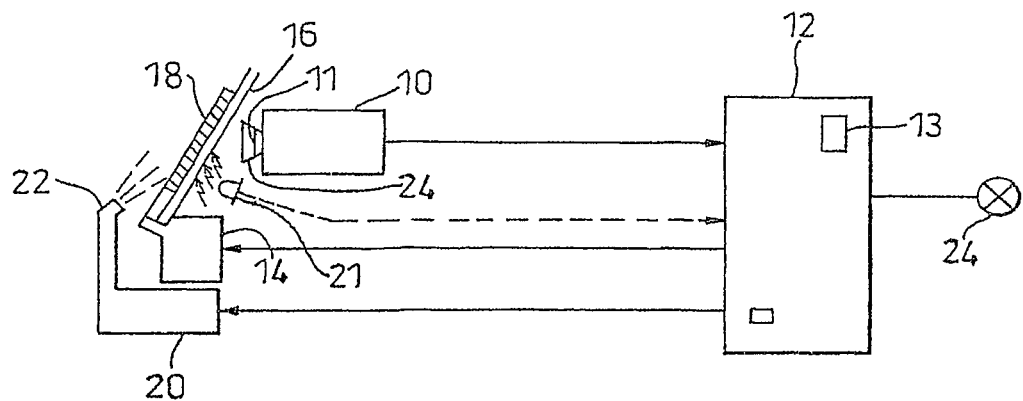
FIG. 1 shows schematically a sensing system according to the present invention.

FIG. 1 shows a sensing system according to the present invention. The system comprises a camera 10, which views the scene visible through a windscreen 16 of a car. The camera is connected to a processor 12, which is adapted to capture images from the camera 10. Also provided are wipers 18 (only one of which is shown in FIG. 1) which are, as is common in the art, in the forms of arms, which can be driven in an arcuate path over the outer surface of windscreen 16 by wiper motor 14. Wiper motor 14 is responsive to signals generated by processor 12. Further provided is washer pump 20, which is optionally adapted to respond to signals generated by processor 12 to pump washer fluid (usually water, perhaps with detergent or anti-freeze additives) onto windscreen 16 through nozzles 22 at an appropriate safe time. The system is also provided with a fault warning light 24, which indicates the presence of a fault condition.

The signals which are generated by the processor 12 in order to control the actuation of wiper motor 14 and optionally the washer pump 20 are calculated at least partly in response to the images captured from the camera 10. These shall now be described hereinbelow for a more specific embodiment of the invention, which uses an edge detection algorithm to determine the amount of rain on the windscreen.

This embodiment also uses the apparatus described above. Camera 10 is mounted inside the body of a car on a mounting bracket (not shown) attached to the roof of the car. The camera views the scene in front of the car through the windscreen. The system, in addition to sensing rain on the windscreen, is adapted to sense the position of other vehicles and lane markings etc. In order to facilitate this, a bifocal lens 24 is fitted to camera 10. The images captured from the camera 10 are therefore split horizontally as exemplified in FIG. 2.

An optional light source, such as IR/LED 21 aimed at back-lighting the windscreen may be provided. This may be enabled when detected or otherwise determined ambient light levels fall below a prescribed level. The effect or the use of the LED would be to highlight the edges of the obscurating media present on the image scene so as to enable the control system to perform more reliably. An optical bandpass filter 11 is also provided, which increases the dominance of the backlight wavelength against the background scene.

Figure 2:
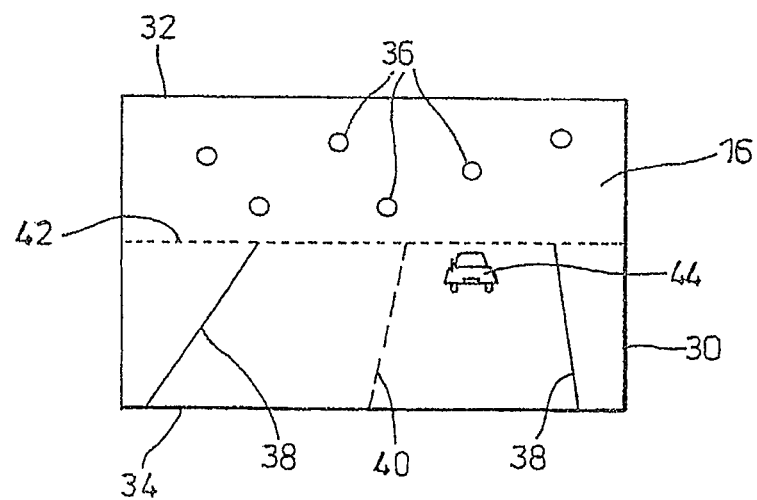
FIG. 2 shows an image captured by a video camera.

FIG. 2 shows an example image 30 captured by the camera 10. The image 30 is split into a top part 32 and a bottom part 34, divided by a dividing line 42. This line 42 is not normally visible in the image but has been depicted for purposes of clarity. The top part 32 has been focused on the outer surface of windscreen 16 on which raindrops 36 are visible. In the bottom part 34 of the image, the image has been focused on the road ahead whereby features such as road edges 38, lane markings 40 and other vehicles 44 can be seen. The processor can then use any of the methods known in the prior art to calculate the position of these features. Unless specifically mentioned, when referring to the images we shall henceforth refer to the top part 32 of the captured images as the part relevant to the amount of rain on the windscreen.

Figure 3:
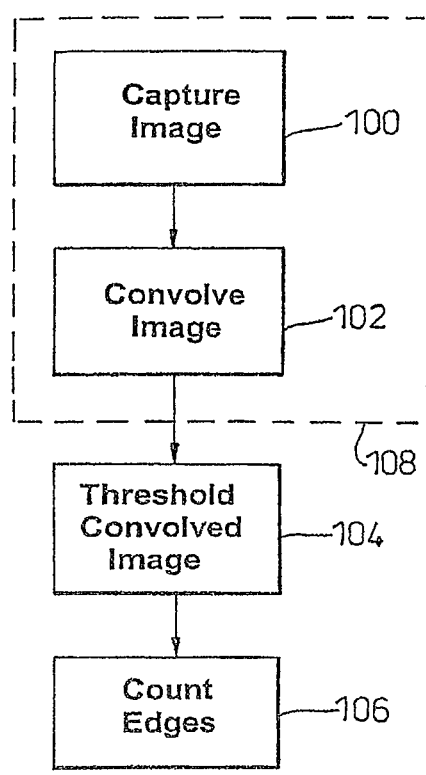
FIG. 3 is a flow chart depicting a first method of estimating the amount of rain on a windscreen.

In order to calculate the need to wipe the windscreen 16 the steps of a first method, shown in FIG. 3, are taken. Firstly, at step 100, the processor 12 periodically captures the top part 32 of images viewed through the camera 12. This occurs N times a second, although it is envisaged that it may be more or less frequent. By way of example only, N may be in the range 15 to 40 times a second.

The next step 102 is for the captured images to be convolved with a mask, such as a Sobel-like mask. The resultant values represent the spatial rate of change, in the horizontal direction, of the pixel intensity of the image. Taking a threshold 104 of these values (that is, determining the points in the image at which the convolved values exceed a pre-determined value) then gives an indication of where the vertical edges of raindrops 36 lie.

This method of edge detection is used as it is commonly in use in lane and vehicle detection systems, such as is known from WO 99/44173.

Figure 7:
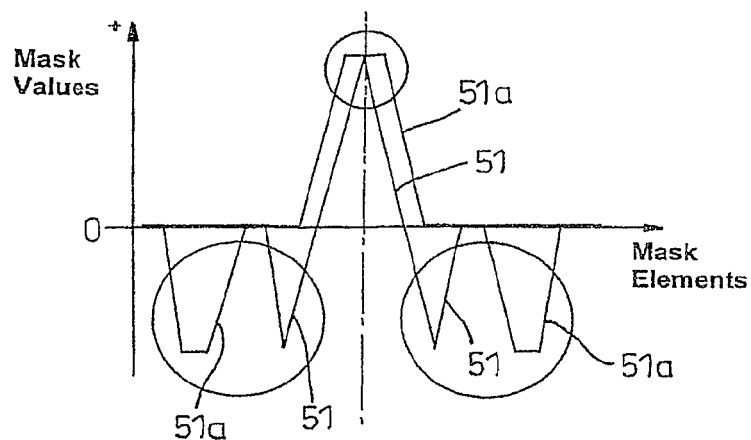
FIG. 7 shows a mask for use in convolving the captured images.

An alternative edge detection scheme replaces convolution with the Sobel-like mask with convolution with the mask 51 depicted in FIG. 7 of the accompanying drawings. This consists of a central peak with two outer troughs to either side (in convolution space). The peaks and troughs have linear leading and rising edges and may have areas of constant value between them or at their absolute maxima. Convolution with this mask gives high values for edges, but edges that occur close to large areas of light are penalized. Accordingly, vehicle headlights and the specular reflection of the backlight 21 off the vehicle windscreen 16 are disregarded as not being raindrops. The width and position of the peaks (as in trace 51a of FIG. 7 of the accompanying drawings) can be adjusted in order to tune the raindrop detection and headlight elimination characteristics.

However, the person skilled in the art will recognize that any suitable edge detection algorithm could be used.

In the next step 106, the number of edges is counted. This gives an indication of the amount of rain present on the windscreen 16 particularly where day and/or night screens are being viewed and where the glare from oncoming headlights would need to be accounted for. Use of multiple mask types, enables independence upon the prevailing ambient scene conditions to be complemented using a simple suitability logic.

Figure 10:
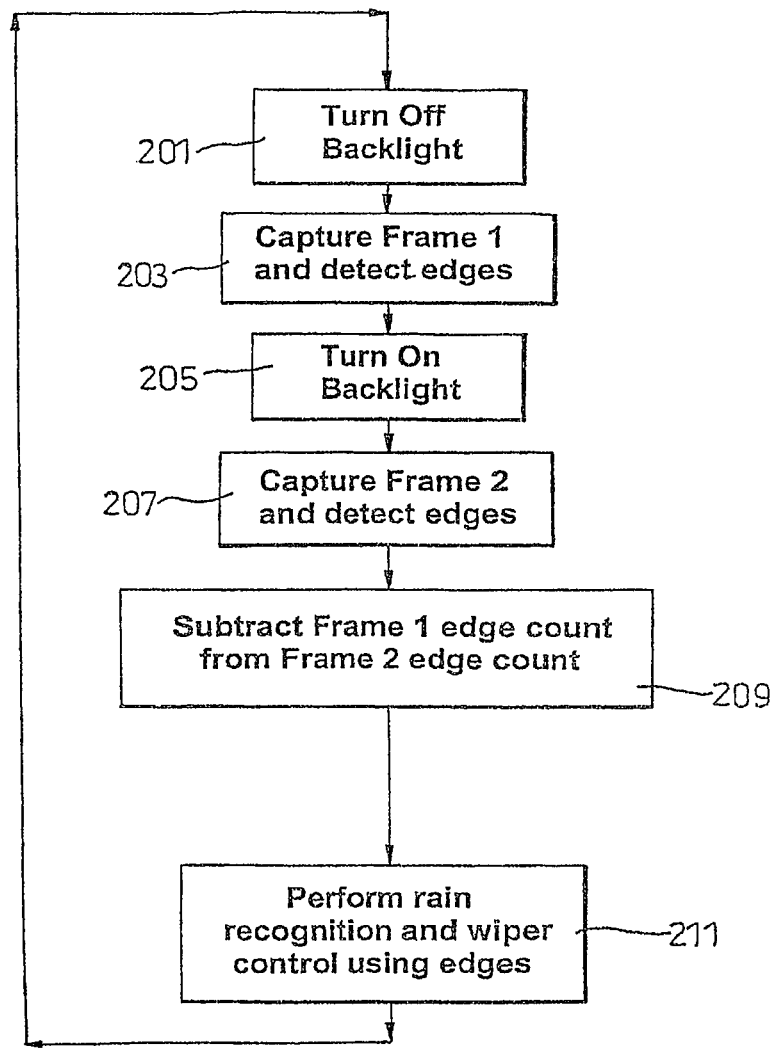
FIG. 10 shows an Edge Subtraction technique according to the present invention.

In an improvement to this step shown in FIG. 10 of the accompanying drawings, the backlight 21 may be employed to increase the visibility of the edges of raindrops. The backlight 21, camera 10 and edge detection method can be arranged such that edges of raindrops are only detected when the backlight 21 is illuminated. Images are captured without 203 and with 207 the backlight 21 illuminated, and the number of edges in each of the images calculated. Images captured without the backlight illuminated will only show background details such as passing scenery and headlights of oncoming vehicles. Illuminated images will show the same features, plus highlighted raindrops and the specular reflection of the backlight in the windscreen. The number of edges for non-illuminated images then is subtracted 209 from the number of edges for the illuminated images. This value can be used to control 211 the wipers of the vehicle in the manner described below.

Figure 9:
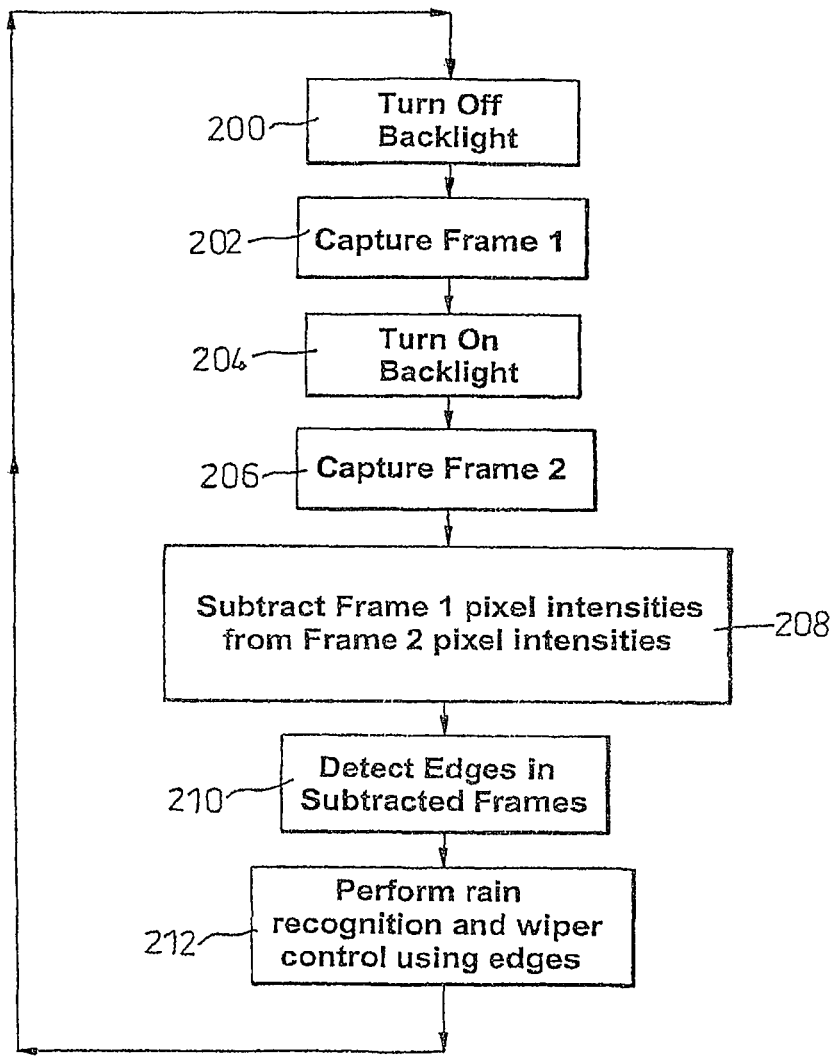
FIG. 9 shows a Frame Subtraction technique according to the prior art.

Accordingly, such artifacts as headlights and passing scenery can be accounted for without the complications and memory requirements of comparing frames, as in the prior art method shown in FIG. 9 of the accompanying drawings. The prior art method requires frames to be captured without 202 and with 206 the backlight illuminated and the pixel values for each frame are subtracted from one another. Edges are detected 210 in the resultant image and wiper control 212 carried out from the determined number of edges. This requires much more memory and processor time than the method of FIG. 10 of the accompanying drawings, as entire frames are compared rather than single numbers of edges.

If the specular reflection of the backlight has not been removed from the detected edges by the alternative mask 51, then these reflections can be accounted for by subtracting a further, predetermined amount from the number of edges for the illuminated images.

Figure 4:
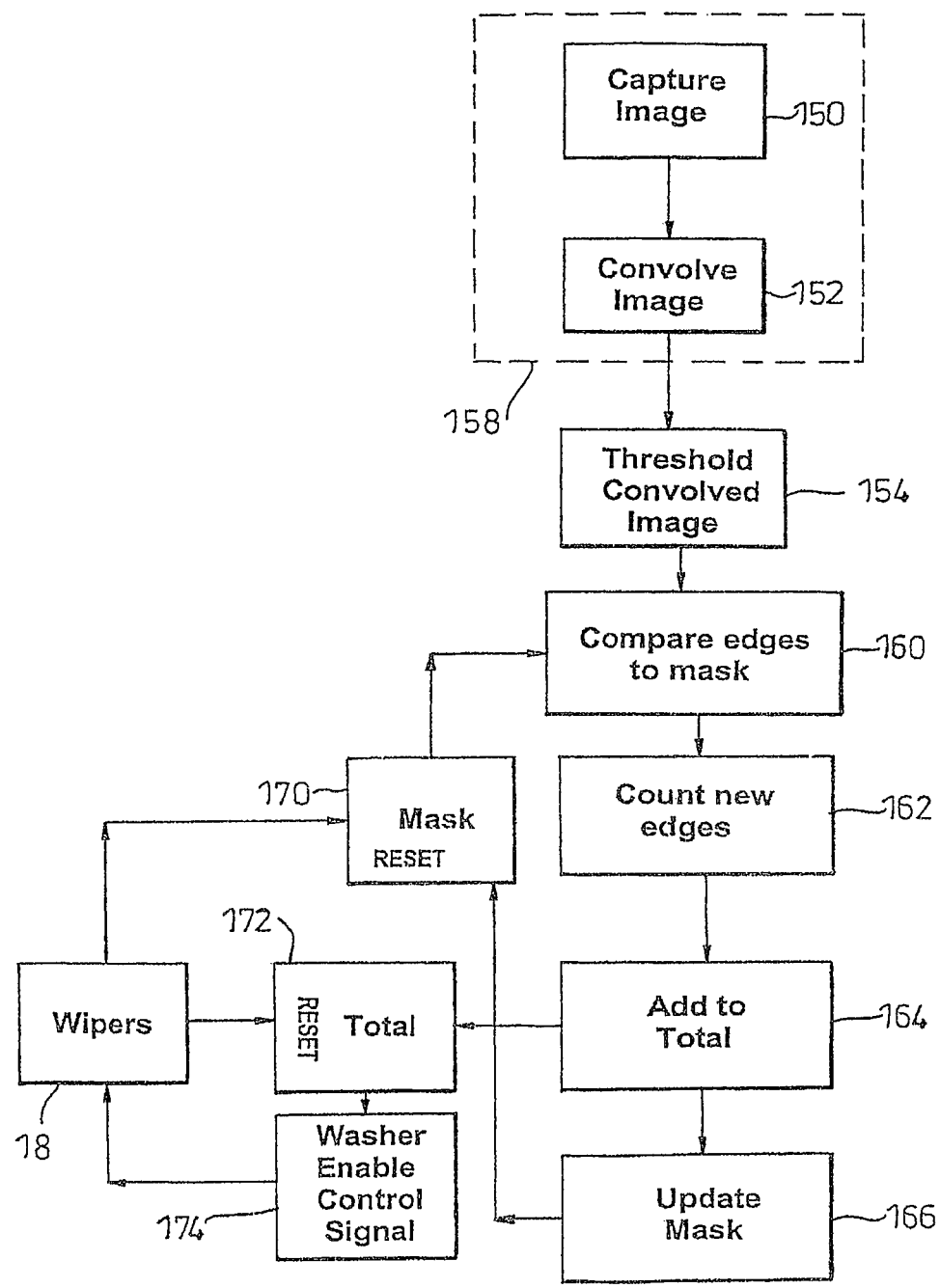
FIG. 4 is a flow chart depicting a second method of estimating the amount of rain on a windscreen.

In an alternative embodiment, the first method of determining the amount of rain on the windscreen is replaced by a second method depicted in FIG. 4. Steps equivalent to those in the first method have been indicated by the same numeral increased by 50.

In this method, the images are periodically captured 150, convolved and thresholded 154 as in the first method. The resultant edges are then compared 160 to a mask 170 stored in a memory 13 associated with the processor 12. The mask 170 indicates which part of the scene is already considered to be an edge of a raindrop, and so initially the mask 170 will be blank. The comparison hence shows the raindrops which have formed edges since the mask 170 was last updated. The number of these new edges is counted 162 and added 164 to a running total 172. This total 172 will initially be zero.

The mask is then updated 166 by dilating the new edges by a dilation amount of, say, 5 pixels and marking the dilated edges on the mask 170 as having been seen. This is a reasonable compromise between mistaking old edges that have simply moved slightly with respect to the camera 10 as new edges and mistakenly ignoring new edges that form. Of course, this dilation amount can be varied to achieve the best results.

The method then repeats with the next image captured 150 from the camera using the updated mask 170 and total 172. It can be seen that the total will never decrease merely from adding the number of new edges. Accordingly, it is necessary to reset the total 172 and mask 170 when a signal from the wipers 18 indicates the screen is freshly wiped. Alternatively, the first method may be employed to give a reading of total number of edges visible and the total 172 and mask 170 could be reset if a large, sudden, decrease in the total number of edges according to the first method was seen.

To estimate the amount of rain on the windscreen, it is possible to use the total number of edges from either method. Additionally the number of new edges in each image as calculated by the second method can be used as an indication of the rate of fall of rain. When a prescribed or adapted threshold number of edges is reached, an enabling control signal 174 may be generated causing the wash/wipe cleaning apparatus to be activated to sweep and clean the windscreen.

Figure 13:
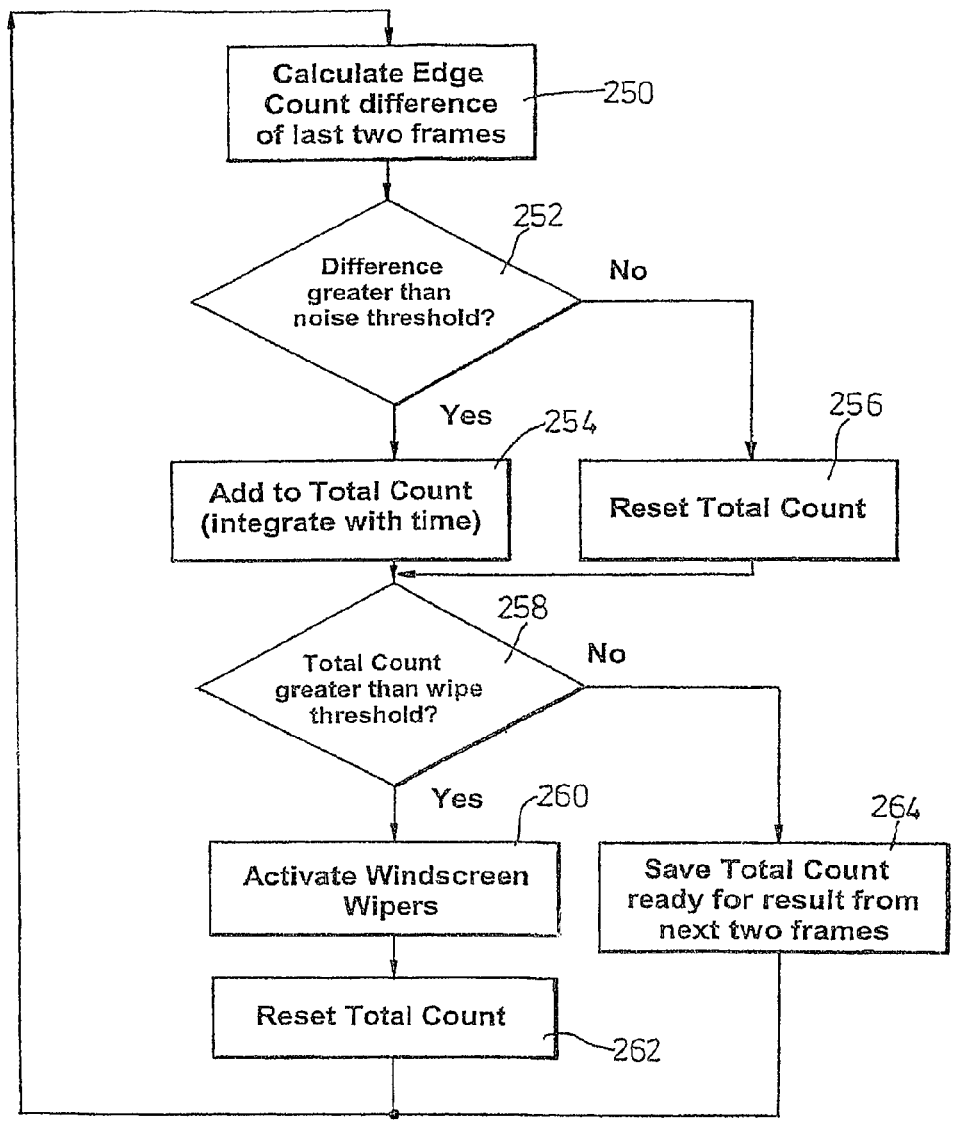
FIG. 13 shows a wiper control strategy.

In a preferred alternative depicted in FIG. 13 of the accompanying drawings, the number of edges is integrated over times such that small amounts of rain are cleaned off the windscreen after a maximum period. The number of edges for a given frame is counted 250 according to any of the methods described above. If this value is greater than a predetermined "noise" threshold 252, then the number of edges is added 254 to a running total. If not, the running total is reset to zero 256. If the running total exceeds a predetermined "wipe" threshold 258, the wipers are activated 260 and the running total reset 262. Otherwise, the running total is kept 264 for the next captured image. The method then repeats.

Figure 5:
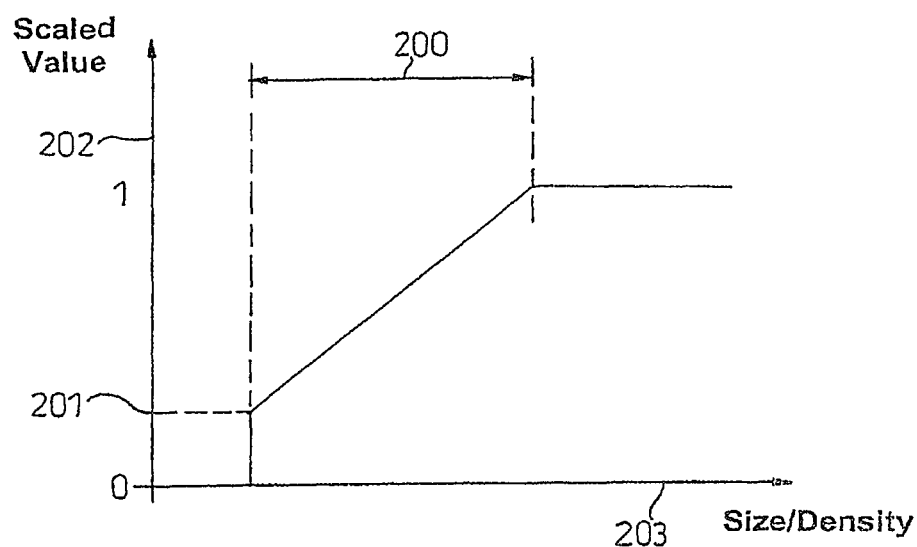
FIG. 5 is a graph showing the relationship between average raindrop size or density and the intermediate, scaled, value.
Figure 6:
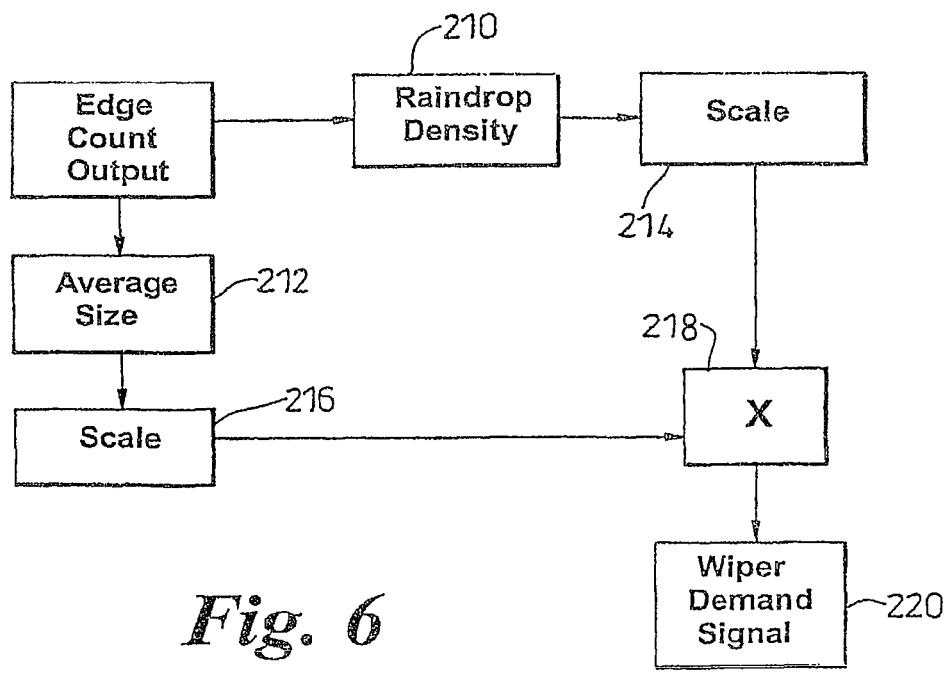
FIG. 6 shows the steps taken in calculating the wiper demand signal from the edge count out part.

In a further optional refinement, the processor 12 may then use these aforementioned outputs to calculate average size 210 and density 212 of raindrops on the windscreen 16, as shown in FIG. 6. These are then each scaled 214,216 to give a value between 0 and 1 according to FIG. 5. Below a certain range 200 of raindrop size or density 203 the scaled value 202 is constantly zero; above the range 200 the scaled value 202 is constantly 1; and within the range 200 the scaled value 202 increases linearly with raindrop size or density 203 from a minimum scaled value 201 (which is between 0 and 1) to 1. These two scaled values are multiplied together 218 to give a wiper demand signal 220 between 0 and 1. This signal 220 indicates the fraction of maximum wiper speed at which the wipers 18 should run, where 0 is no wiper action and 1 indicates maximum speed, providing for the wipers 18 only operating above a certain threshold of both size 210 and density 212 of raindrops.

The method used in this system is advantageously combined with a vehicle lane and object detection system as the steps of capturing 100, 150 and convolving 102, 152 images (grouped as 108 and 158 in FIGS. 3 and 4) are already performed by such a detection system and hence the addition of a rain drop detection system as described herein does not unduly increase computational requirements. As to the choice between first and second methods, the first method requires less computational power and memory. However, it will produce much noisier results as raindrops shift with vehicle vibrations and so on, and as the unfocused scene behind the windscreen changes. As the second method uses an Edge Boundary Masking algorithm, it is less affected by these problems but requires more in the way of memory 13 and processor 12 use.

It is also appreciated that whilst with the cameras which are envisaged to be used in this system will not clearly capture the image of a passing wiper 18 and so the system will not recognized as an edge. However, cameras that are capable of sharply capturing moving wipers may be used in which case correction must be made such that the wiper edges are not unduly counted.

Figure 8A:
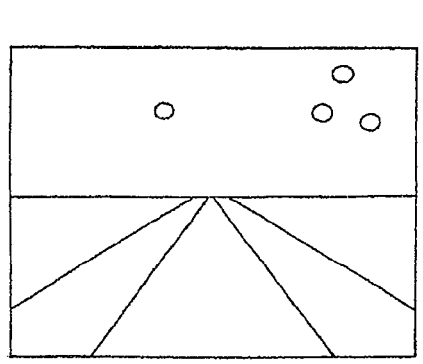
FIGS. 8a, 8b and 8c show the effect of the presence of mist on the windscreen.
Figure 8B:
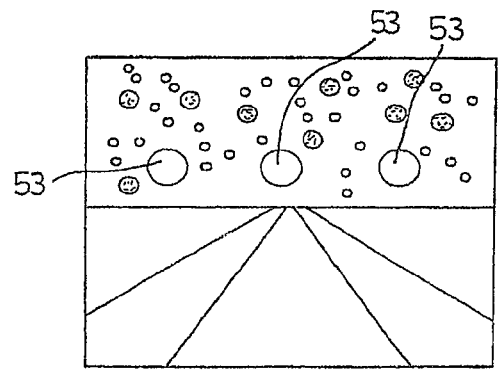
Figure 8C:
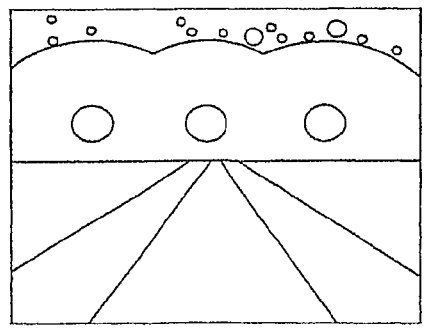
Figure 12:
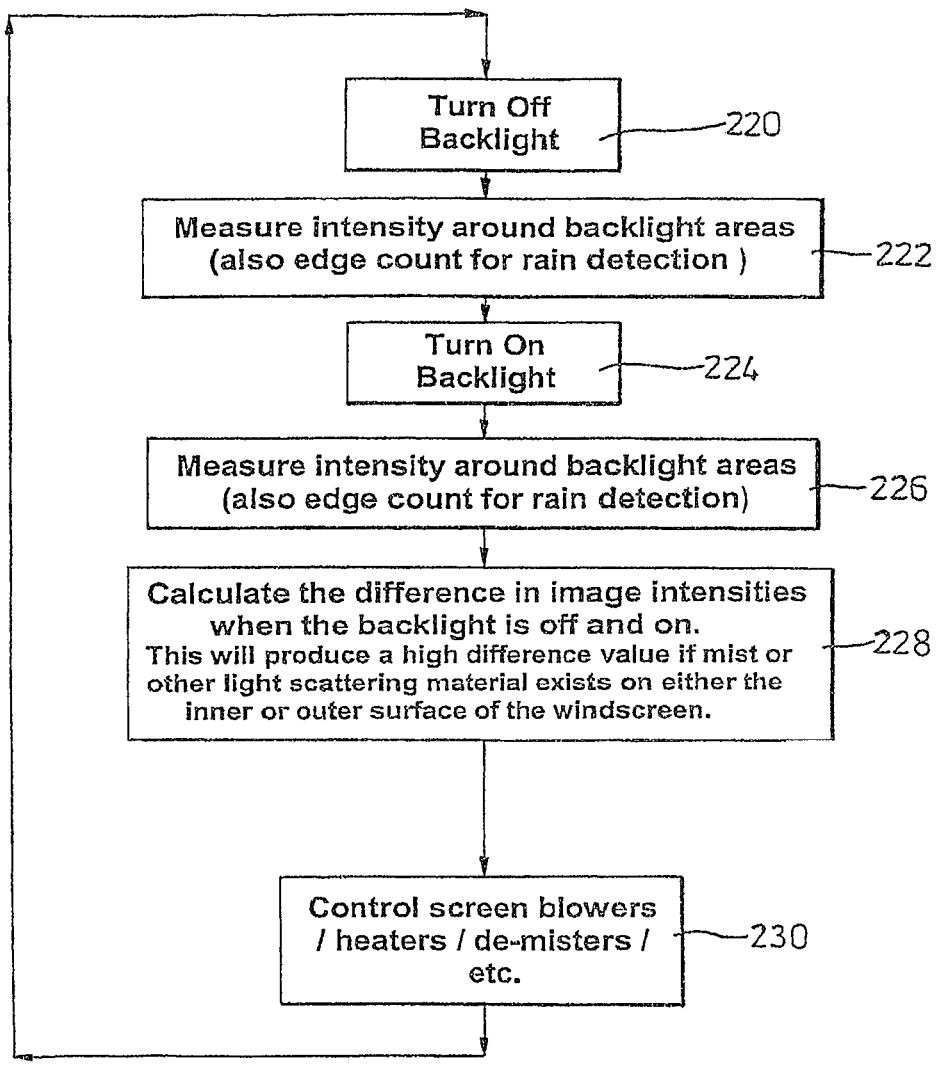
FIG. 12 shows the steps carried out in order to detect the presence of mist on the windscreen.

In another improvement, the system is adapted to detect the presence of mist on the windscreen. This can be demonstrated with reference to FIGS. 8a to 8c of the accompanying drawings, which depict views captured from the camera 10, and FIG. 12 of the accompanying drawings, which show the steps taken. In normal view, without the backlight illuminated 220 (FIG. 8a of the accompany drawings), the camera views the background scene and any raindrops on the windscreen. The average intensity surrounding the specular reflections of the backlight is measured 222. The backlight 21 is then turned on 224. In the lack of mist, illuminating the backlight 21 (FIG. 8b of the accompanying drawings) does not have any great effect on the average intensity surrounding the specular reflections 53 of the backlight. However, if mist is present (FIG. 8c of the accompanying drawings) then large amounts of diffuse, non-specular, reflection occur, and the intensity in the region surrounding the specular reflections of the backlight is greatly increased. Therefore, if the average intensity around the specular reflections 53 is calculated 226 and the difference between the two measured average intensities taken 228, the presence of mist can be detected as a large difference. This can then be monitored by the system, which can activate 230 demisting heaters, blowers and so on as appropriate.

Figure 11:
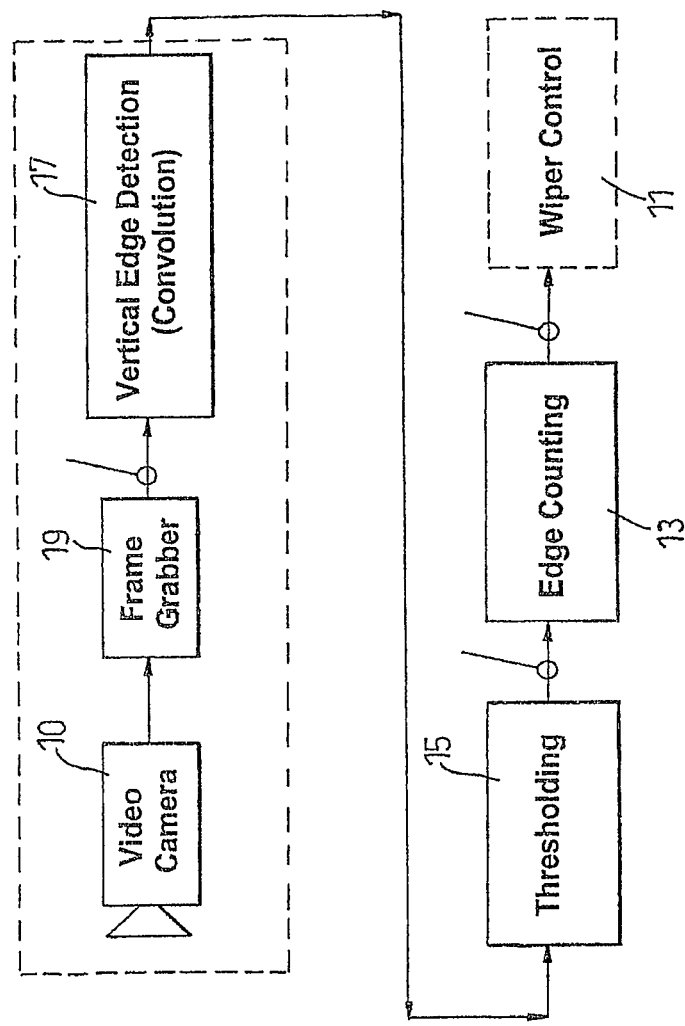
FIG. 11 shows the steps carried out in this method in common with a lane detection technique.

FIG. 11 of the accompanying drawings shows how the system herein described is advantageously used in combination with a lane detection technique. The video camera 10, the frame grabber 19 (that part of the processor 12 adapted to capture images from the camera 10) and the vertical edge detection 17 are all identical for both the rain detection technique described herein and a lane detection technique. The same processor may therefore run the same instructions on the same data. Only the thresholding 15, edge counting 13 and wiper control 11 add to the processing and hardware requirements.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A rain detection apparatus comprising:
   a camera adapted to view a surface being a window of a vehicle; and
   a processor adapted to capture at least one image from the camera, wherein
   the processor is further adapted to generate at least one signal indicative of the presence of rain on the surface from information contained in the at least one captured image, and
   the apparatus is adapted to capture images focused at a plurality of distances comprising a first distance corresponding to viewing the window of the vehicle and a second distance corresponding to viewing a road ahead of the vehicle, wherein each image captured by the camera is focused at a plurality of distances, in which the plurality of distances includes the first and second distances, and the first distance is a distance from the camera to the window and the second distance is a distance from the camera to the road.

2. The rain detection apparatus of claim 1 wherein the camera comprises a multi-focal lens.

3. The rain detection apparatus of claim 2 wherein the multi-focal lens is a bi-focal lens.

4. The rain detection apparatus of claim 1 wherein the processor is furthermore arranged to sense the location of other vehicles or of lane markings on the road.

5. A method of detecting the presence of rain on a surface being a window of a vehicle comprising the steps of:
   using a camera to capture images of the surface; and
   using a processor to determine the presence of rain on the surface from the captured images, wherein the captured images are focused at a plurality of distances comprising a first distance corresponding to viewing the window of the vehicle and a second distance corresponding to viewing a road ahead of the vehicle, and wherein each image captured by the camera is focused at a plurality of distances, in which the plurality of distances includes the first and second distances, and the first distance is a distance from the camera to the window and the second distance is a distance from the camera to the road.

6. The method of claim 5 further including the step of detecting the positions of lanes or vehicles surrounding a vehicle from information contained in the at least one captured image.

7. The method of claim 5 wherein camera used to capture images of the surface comprises a multi-focal lens.

8. The method of claim 7 wherein the multi-focal lens is a bi-focal lens.

* * * * *